J. M. BRYANT.
CORN PLANTER AND FERTILIZER DISTRIBUTER.
APPLICATION FILED APR. 9, 1914.
1,135,433.
Patented Apr. 13, 1915.
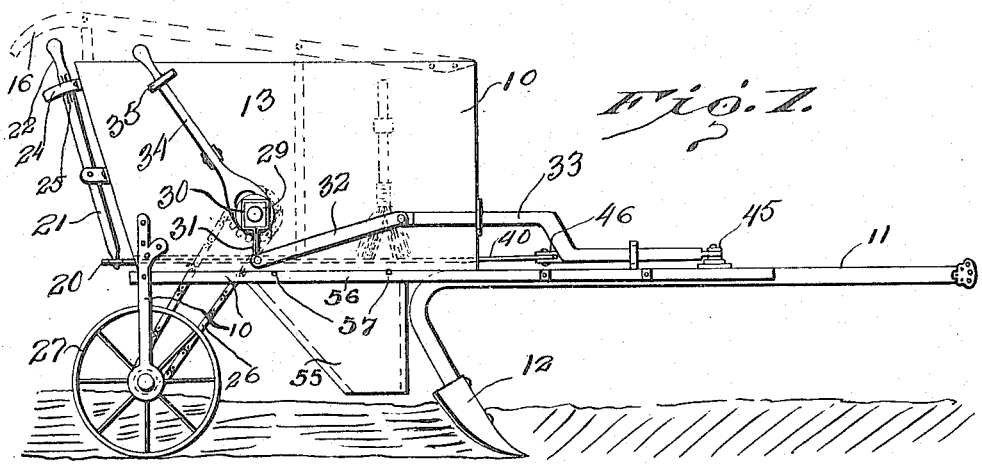
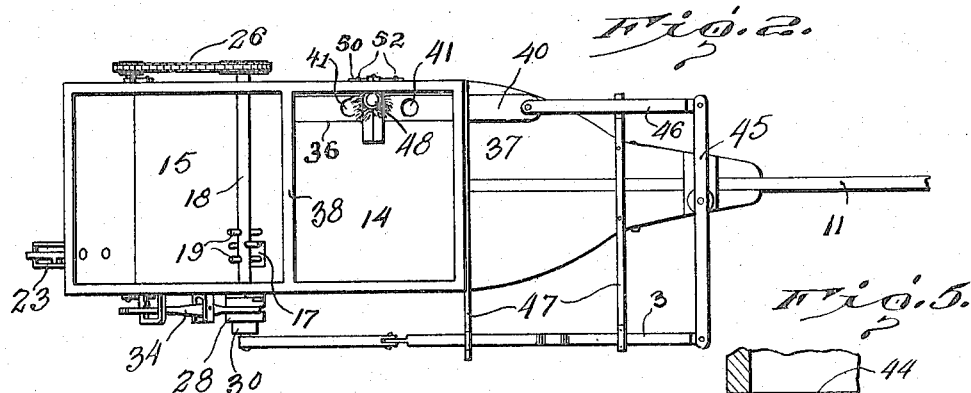
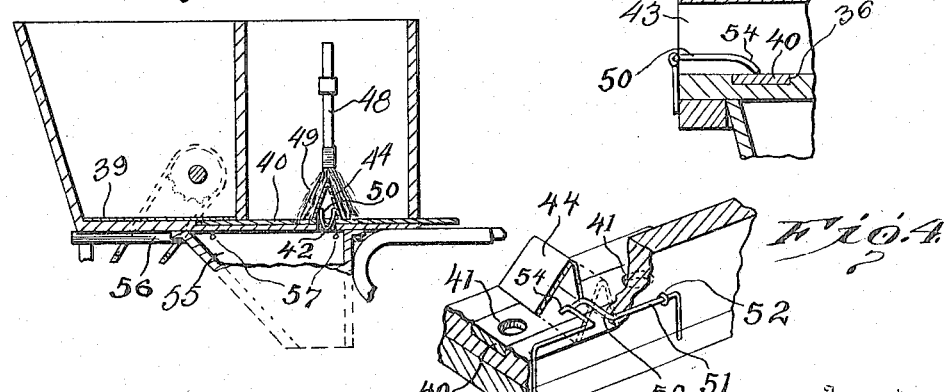
Inventor
J. M. Bryant.
Witnesses
Robert T. Beck
Chr. Nielsen, Jr.
By H. L. Woodward
Attorney

UNITED STATES PATENT OFFICE.

JESSE M. BRYANT, OF ARARAT, NORTH CAROLINA.

CORN-PLANTER AND FERTILIZER-DISTRIBUTER.

1,135,433.

Specification of Letters Patent.

Patented Apr. 13, 1915.

Application filed April 9, 1914. Serial No. 830,678.

*To all whom it may concern:*

Be it known that I, JESSE M. BRYANT, a citizen of the United States, residing at Ararat, in the county of Surry and State of North Carolina, have invented new and useful Improvements in Corn-Planters and Fertilizer-Distributers, of which the following is a specification.

The invention has for an object to simplify the operative connections for a planter and adapt them to be quickly thrown out of operative relation. It is also the purpose to simplify the manufacture thereof.

A further object of importance is to improve the dropping mechanism whereby liability of jamming in the corn in the feed opening from the hopper will be prevented.

Another attainment is to provide means to prevent an excessive amount of grain from gaining access to the pocket of a sliding shuttle.

Additional objects, advantages and features of invention will appear, some of which will be apparent from the following description, and from the drawings, in which, Figure 1 is a side elevation of a planter constructed in accordance with my invention. Fig. 2 is a top view thereof. Fig. 3 is a detail of the bottom. Fig. 4 is a detail perspective of the feed mechanism. Fig. 5 is a fragmentary cross section thereof.

There is illustrated a planter comprising a wheeled frame 10, including the beam 11, the rear end of which is bent downwardly beneath the frame and provided with a drill point 12. Upon the frame there is built a transversely partitioned hopper 13, having the grain chamber 14 at the forward part and the fertilizer chamber 15 at the rear. Suitable handles 16 are secured to each side of the hopper and projecting rearwardly therefrom, whereby the device may be suitably guided in operation. Formed in the bottom of the chamber 15 there is a large discharge opening 17, and mounted transversely in the chamber there is a revoluble shaft 18 having agitators 19 thereon, by which material in the chamber will be stirred and its discharge facilitated. The size of the opening 17 is regulated by means of a shutter 20 mounted slidably in the bottom of the hopper and adapted to close the opening 17 when at the inner limit of its movement. The shutter projects rearwardly of the hopper, is apertured thereat and receives the end of a lever 21 mounted on the rear side of the hopper and provided with a handle 22 extending slightly above the hopper and a little inwardly of the grip portion of the handle 16. The position of the lever is regulated by means of teeth 23 on a segment 24 against which the lever bears resiliently, a rib 25 being formed on the lever for the purpose of engaging these teeth.

The shaft 18 projects from each side of the hopper, having a suitable driving connection 26 from one or more supporting wheels 27. The opposite end of the shaft is provided with a clutch device 28, the driven element of which includes a rectangular stub 29, upon which there is set a corresponding yoke 30, having the crank arm 31 connected to the pitman 32, by which a forwardly projecting sliding rod 33 is reciprocated. The clutch is adapted to be thrown in or out of engagement by means of the lever 34, pivoted upon the side of the hopper, the movement of this lever being regulated by a segment 35 similar to the one 24 before mentioned. At the left hand side of the hopper there is formed in its floor a channel 36, extending longitudinally across the chamber 14, onto the floor 37 of the frame 10, forwardly of the hopper, and also passing under the partition 38 in the hopper and beneath the metal floor 39 of the chamber 15. In this channel there is reciprocable a shutter 40, consisting of a plate of suitable material, wood being used in practice having suitable thickness and breadth, in order that the openings formed therein in longitudinally spaced relation may accommodate the desired quantity of grain.

A discharge opening 42 is formed through the bottom of the hopper intermediately of the length of the channel 36, and mounted across the channel and extending through a suitable opening 43 in the adjacent side of the hopper, there is a V-shaped housing 44 closed at its inner end and serving to prevent access of grain to the openings 41 when over the discharge opening. The shuttle has a thickness corresponding to the depth of the channel 36 so that its upper side lies flush with the upper side of the floor of the hopper. Pivoted upon the forward part of the frame there is a lever 45, having one end connected to the forward end of the rod 33, and its opposite end connected by a link 46 to the forward end of the shuttle 40. The openings 41 are so arranged on the shuttle that they will register with the discharge opening 42 when the shuttle reaches respective limits of its movement. The rod 33 is so supported by brackets 47 as to have the necessary lateral movement in oscillating the lever 45.

In order to prevent jamming of grain between the edges of the housing 44 and the sides of the opening 41 a brush device 48 is mounted on the side of the hopper, having bristles 49 extending downwardly on each side of the housing 44 and brushing against the shuttle, whereby grain in the hopper is prevented from feeding into the openings of the shuttle immediately adjacent the housing 44. By reason of the housing 44 being open through the side of the hopper, access to the shuttle and discharge opening 42 while the hopper is filled is made easily possible. A spring 50 is provided for insuring dropping of grain from the shuttle in the discharge opening 42. This spring consists of a moderately heavy wire including the axis portions 51 secured against the sides of the hopper by staples 52, the outer ends being turned downwardly over the sides of the hopper while the intermediate portion is extended inwardly in a U-shape, the bight portion 54 of which is curved downwardly, and adapted to bear upon the shuttle. This bight portion is also sufficiently reduced in breadth to project into the openings 41 a short way.

It will be seen that a planter of a practical form is presented, the guidance of the device when hitched to a horse being readily accomplished, at the same time that the control of the dropping mechanism both for grain and fertilizer may be controlled through the levers 21 and 34, the handles of which may be conveniently grasped by the operator and manipulated while the planter is in motion.

A single chute or spout 55 is mounted beneath the hopper to conduct fertilizer and seed to the drill, this spout having a large upper end secured between two elements 56 at respective sides of the frame 10, by means of removable pins 57.

What is claimed is:

1. In a grain planter, a hopper having an apertured bottom, a feed shuttle reciprocable thereon and having apertures adapted to register with that in the bottom, a housing over the aperture in the bottom an opening being formed through the side of the hopper, the housing being fitted thereto and open in registry therewith, for the purpose described, and a spring element in the housing having a portion tending to bear into the aperture of the bottom and shaped to be engaged by the block and fended upwardly, as described.

2. In a grain planter, a hopper having a discharge opening, and a lateral opening thereadjacent a housing over the discharge opening, said housing being open in registry with said lateral opening an element movable over the opening and through the housing, said shuttle having longitudinally spaced openings arranged to lie one without the housing and the other in registration with the discharge opening at each limit of the movement of the shuttle, a spring comprising a piece of wire bent to form a V-shaped bight presented downwardly within the housing in line with the shuttle opening, the ends of the wire disposed adjacent the sides of the housing and being secured without the hopper adjacent the said lateral opening.

3. A hopper having a discharge opening in its bottom, an element movable thereover for the function described, a housing over the discharge opening and shuttle opening through the side of the hopper, a spring comprising a wire having a V-shaped bight presented downwardly over the discharge opening, the end portions of the wire being extended outwardly, and then laterally close against the outer side of the hopper, and then vertically, and being secured to the outer side of the hopper under tension to bear the bight downwardly into said described opening.

In testimony whereof I have hereunto set my hand in presence of two subscribing witnesses.

JESSE M. BRYANT.

Witnesses:
W. R. BADGETT,
O. E. SNOW.

Copies of this patent may be obtained for five cents each, by addressing the "Commissioner of Patents, Washington, D. C."